United States Patent
Calder et al.

(10) Patent No.: US 6,594,347 B1
(45) Date of Patent: Jul. 15, 2003

(54) SPEECH ENCODING IN A CLIENT SERVER SYSTEM

(75) Inventors: Gary James Calder, Eastleigh (GB); George Murdoch Clelland, Alresford (GB); Anthony Timothy Farrell, Romsey (GB); Robert Mann, West Wellow (GB); John Brian Pickering, Winchester (GB); Paul Reilly, Lockerley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,481

(22) Filed: Apr. 18, 2000

(30) Foreign Application Priority Data

Jul. 31, 1999  (GB) ............................................... 9917931

(51) Int. Cl.⁷ ........................ H04M 1/64; H04M 1/00; G01L 15/04; H04B 1/38
(52) U.S. Cl. ............................. 379/88.01; 379/88.14; 704/251; 455/563
(58) Field of Search .......................... 379/88.01, 88.03, 379/88.04–88.06, 88.13–88.14, 93.26–93.37; 704/251, 246, 252; 455/270, 414, 563

(56) References Cited

U.S. PATENT DOCUMENTS

| | | | | |
|---|---|---|---|---|
| 4,897,865 A | * | 1/1990 | Canuel | 379/144.01 |
| 5,884,262 A | * | 3/1999 | Wise et al. | 379/67.1 |
| 5,905,774 A | * | 5/1999 | Tatchell et al. | 379/88.01 |
| 6,208,966 B1 | * | 3/2001 | Bulfer | 379/88.01 |
| 6,219,638 B1 | * | 4/2001 | Padmanabhan et al. | 379/100.08 |

FOREIGN PATENT DOCUMENTS

| | | | | |
|---|---|---|---|---|
| EP | 0893901 | 1/1999 | | H04M/1/27 |
| WO | 9712361 | 4/1997 | | G01L/9/00 |

* cited by examiner

*Primary Examiner*—Fan Tsang
*Assistant Examiner*—Joseph T. Phan
(74) *Attorney, Agent, or Firm*—Jerry W. Herndon

(57) ABSTRACT

Speech encoding in a client server system such as a laptop, personal data assistant or mobile phone communicating with an interactive voice response telephony application. A method of communication with a speech enabled remote telephony device such as a mobile phone is described comprising the following steps. Receiving user speech input into the mobile phone as part of a dialogue with an interactive voice response telephony application. Performing speech recognition to convert the speech into text and converting the text into tones such as DTMF tones. Transmitting the DTMF tones over the voice channel to an interactive voice response (IVR) telephony application an allowed response feature converts the users response to a known valid response of the IVR application. A language conversion feature allows a person in one language to speak in that language to an IVR application operating in a different language.

24 Claims, 7 Drawing Sheets

FIG. 4

| Client | Server | Client Process |
|---|---|---|
| Goes "off hook" or "dials" or establishes contact with the Server (Step 1A) | Initial transaction set up. (Step 2A) | |
| | Plays out prompt(s) requesting account code (Step 3A) | |
| Speaks N digit string (Step 4A) | | |
| | | Client audio channel sent to client-side ASR module (Step 5A) |
| | | ASR module converts the audio signal to the text string "1234..." (Step 6A) |
| | | Result string transferred to the DTMF format converter (Step 7A) |
| | | DTMF sequence passed to client device DTMF generator (Step 8A) |
| | | DTMF tones transmitted to Server (Step 9A) |
| | Server receives and processes DTMF input (Step 10A) | |
| | Server validates and checks against back-end account database (Step 11A) | |
| | Server plays "Account code: 1234...; for balance enquiry, say 1....etc" (Step 12A) | |

FIG. 6

| Client | Server | Client Process |
|---|---|---|
| | Plays prompt: "would you like to leave a message" (Step 1B) | |
| Takes caller response, and recognises the audio input | | Client-side ASR |
| caller says Yes (please) (Step 2B) | | Client maps Yes (please) to LEAVE MESSAGE, and transmits to Server; or to Yes; or to DTMF 1 as dictated by the result mapping file (Step 3B) |
| | Plays prompt: "for whom?" (Step 4B) | |
| (a) caller says John Smith (Step 5B) | | Client maps John Smith to MESSAGE FOR JOHN SMITH or MESSAGE FOR MBOX XYZ (Step 6B) |
| (b) caller says Yes, for John Smith (Step 7B) | | Client maps Yes to LEAVE MESSAGE and MESSAGE FOR JOHN SMITH or MESSAGE FOR MBOX XYZ (Step 8B) |
| (c) caller says Mailbox 2334 (Step 9B) | | Client maps Mailbox 2334 to LEAVE MESSAGE and MESSAGE FOR MBOX 2334 or MESSAGE FOR XYZ (Step 10B) |
| | Plays prompt: "please speak now/after the tone"....(Step 11B) | |
| Caller speaks message... (Step 12B) | | |

FIG. 7

| Client | Server | Client Process |
|---|---|---|
| Requests service (Step 1C) | | |
| | Identifies itself as en_US (Step 2C) | |
| Identifies itself as fr_FR (Step 3C) | | |
| | Downloads any translation information (like catalogue) (Step 3C) | |
| | "What item do you want" (Step 4C) | |
| Caller says: "Meubles" (Step 5C) | | Client-side translation before onward transmission (Step 6) |
| | "What furniture are you interested in" (Step 7C) | |
| Caller says: "Chaise" (Step 8C) | | Client-side translation before onward transmission (Step 9C).. |
| etc | etc | etc |

SPEECH ENCODING IN A CLIENT SERVER SYSTEM

FIELD OF INVENTION

This invention relates to speech encoding in a client server interactive voice response (IVR) system and especially in a voice enabled hand held, thin client device, such as a laptop, personal data assistant or mobile phone.

BACKGROUND OF INVENTION

For voice enabled hand held devices, such as personal data assistants and mobile telephones, access to back end services providing typical e-business and traditional telephony services is becoming more pervasive. For instance, a mobile telephone user may want to access bank account details through an automated telephone service that uses DTFM key recognition. The user dials the bank's computer server telephone number and is asked to press certain keys in response to various prompts including menu options, account details and passwords. This approach relies on text or DTMF key input, forcing the user away from the benefits of hand free operation which is particularly necessary for mobile users in cars. Furthermore, it can be disruptive for many types of mobile phones where the keypad is located by the speaker to move the phone away from one's ear to enter information.

One solution is to provide speech recognition as part of the telephony application back end service; for example, three different telephony applications with speech recognition capability are shown in FIG. 1. First, a text application is a messaging service which requires a user to enter a text message using the keys of the mobile device; the user speaks to the application and an IVR converts the speech to ASCII text for input to the application. A second application uses DTMF tones for a telephone banking service and requires the user to press certain keys in response to prompts to progress through the application. The user speaks to the application and the speech is converted into DTMF tones for the application. A third application uses Wireless Application Protocol (WAP) and uses a local speech to WAP converter. A user can connect to the network using a mobile phone over a wireless link to a base station physically connected to the network or using a land phone connected to the network. A user may connect to a telephony server using a voice enabled personal data assistant using a wireless link to a base station connected to the network or by a voice enabled computer Internet telephony connection via an Internet gateway to the telephony network. Alternatively, the telephony applications may themselves be Internet enabled and accessed using Internet telephony. Server voice recognition applications have a voice recognition function at the server end and suffer from the disadvantage that the speech signals deteriorate over transmission channels especially for analogue transmission. The capacity of a speech recognition server will limit the number of users. Also the server will be limited in the types of mobile device formats communicating with telephony applications.

According to one aspect of the invention there is provided a method of communication for a speech enabled remote telephony device comprising the following steps: receiving user speech input into the remote device; performing speech recognition to convert the speech into text; providing a set of tone responses expected by the application; mapping the text onto an allowed tone response; and transmitting the allowed tone response over the voice channel to an interactive voice response (IVR) telephony application, said application requiring a tone input format as part of an interactive dialogue with the user whereby the application receives an allowable tone response from the user speech input.

SUMMARY OF INVENTION

According to one aspect of the invention there is provided a method of communication for a speech enabled remote telephony device comprising the following steps: receiving user speech input into the remote device; performing speech recognition to convert the speech into text; converting the text into tones; and transmitting the tones over the voice channel to an interactive voice response (IVR) telephony application, said application requiring a tone input format as part of an interactive dialogue with the user.

This allows a remote device to communicate over a transmission channel to a destination server application and convert the device input format, be it text, speech or video into the server application format for a more robust transmission. Furthermore, the interactive voice application is enabled with voice recognition without voice recognition functionality in the application. The remote device may be a standard telephone over a fixed land telephony link, mobile cellular phone or a mobile computer such as a laptop or personal data assistant over a wireless communication link or any client device remote from a server. The remote device has a microphone for speech capture, but alternatively the mobile device may have a video camera for image capture whereby an interpretation of the image is converted into tones and the tones are transmitted to a telephony server.

The input format may be speech and the mobile device has speech recognition capacity that converts speech into ASCII text or DTMF tones or WAP format. The user may select the output format to be transmitted to the application. Alternatively, the mobile device may select the output format. The device may select the output format depending on a user command, on interaction with a server application, or on a setting stored on a mobile device associated with a server application.

The application may be a financial service or a voice messaging service whereby the caller interacts with the automated service via limited option menus to decide what information is required and what service is wanted. The speech capability may be low function discrete recognition (individual digits 0–9, yes, no, help, etc.). The speech capability may be word spotting from a vocabulary. The speech capability may be continuous recognition. The speech recognition capability is determined by the processing and storage capacity of the device.

This specification relates to the enhancement of a local device as described with speech input capabilities, allowing the user to interact in hands free mode, rapidly and naturally with any remote service. By converting the initial recognition result on the local device to the appropriate format (e.g. WAP commands or DTMF signals), the client-to-server transmission of user requests is rendered more robust over the transmission channel, and additionally, there is no specific requirement for the server to be speech enabled per se since the speech-to-text conversion is effected in the local client device.

Several advantages follow from the above approach. Remote services are speech-enabled without modification to the remote server. Command and control information passed from the client to the server benefits from robust and industry standard transmission. Personalisation is effected at the client end without the need for additional processing at the server end. Users are offered natural and easy to use hands free operation without the loss of quality of service. Users are offered transparent multi-mode accessibility without the service provider needed to make expensive or mode specific changes to their services.

BRIEF DESCRIPTION OF DRAWINGS

In order to promote a fuller understanding of this and other aspects of the present invention, an embodiment will now be described, by way of example only, with reference to the accompanying drawings in which:

FIG. 4 is an example of the event flow of the embodiment;

FIG. 6 is an example of the event flow of the further embodiment; and

FIG. 7 is an example of the event flow of a yet further embodiment.

DETAILED DESCRIPTION OF PREFERRED EMBODIMENT

Figure 1:
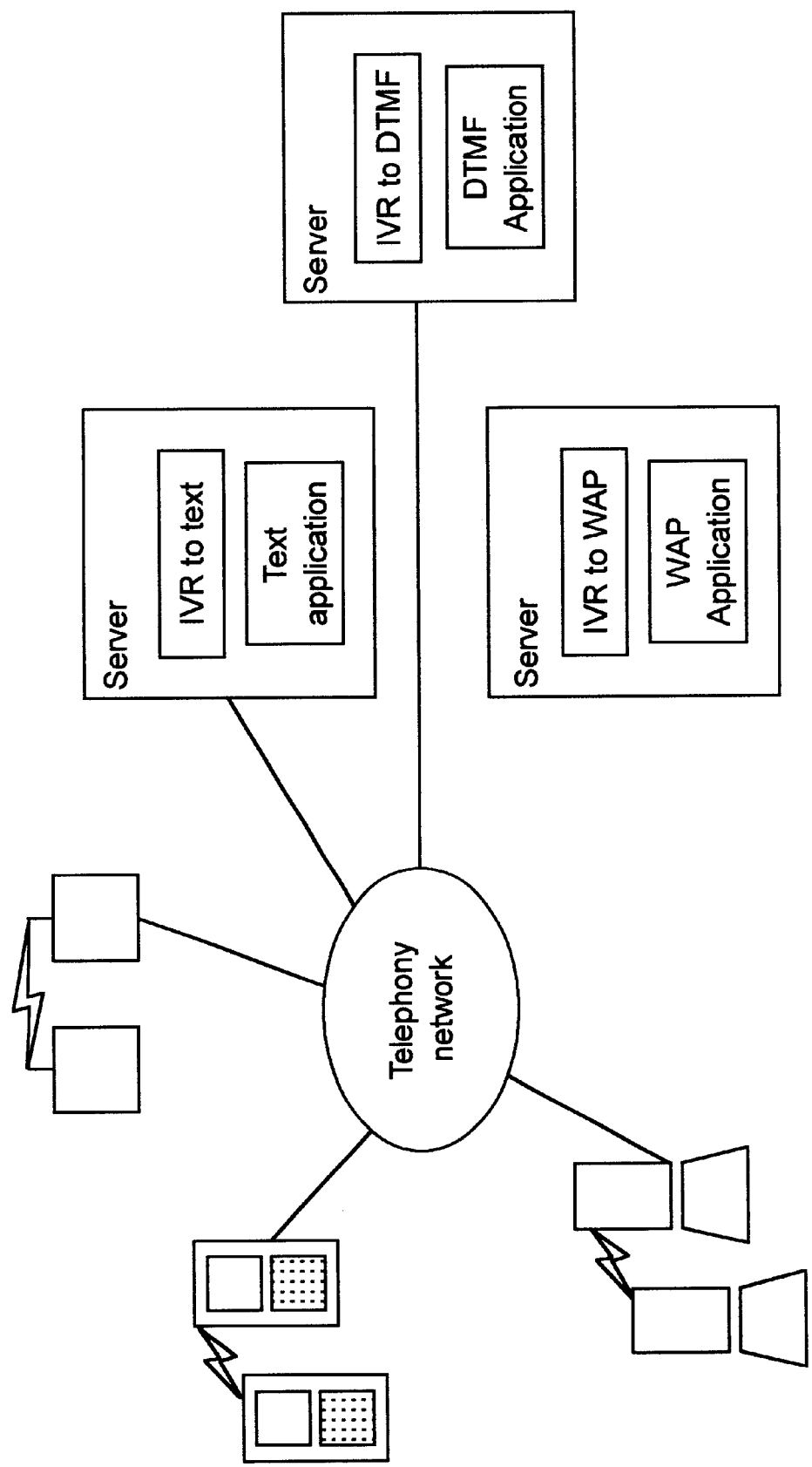
FIG. 1 is a schematic representation of prior art solutions.
Figure 2:
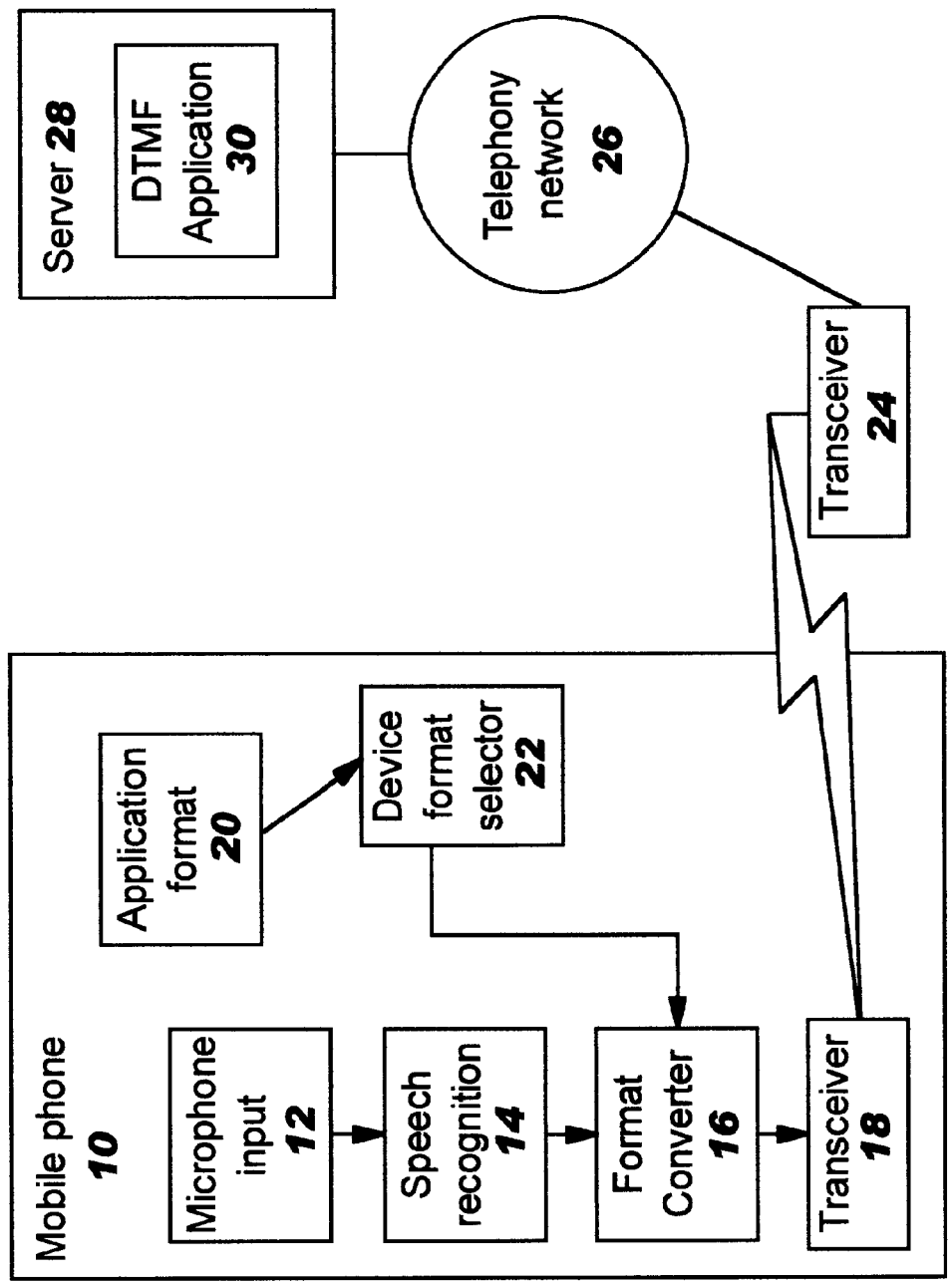
FIG. 2 is a schematic representation of a device of the embodiment.

Referring to FIG. 2 there is shown a mobile phone 10 comprising a microphone input 12, speech recognition unit 14, format converter 16, transceiver 18, application format memory 20 and device format selector 22. Receiving signals from the transceiver 18 is transceiver unit 24 connected through a network 26 to server 28. Server 28 comprises IVR application 30 accepting DTMF tone input.

The microphone 12 detects speech from a user and passes on a voice signal to speech recognition unit 14. The speech recognition unit 14 converts the voice signal from the microphone into a text signal which is passed on to the format converter 16. Speech recognition in the device is provided by a dedicated or shared digital signal processor (DSP). The recognition capabilities are limited by the MIP rate and memory (DRAM and IRAM) of the DSP. The unit 14 is speaker independent. Alternatively the unit is speaker dependent in which case a stand alone training capability is required to improve the speech recognition quality. The speech recognition functionality is based on IBM's Via Voice technology which has been adapted for a small client mobile phone. Updates or maintenance upgrades can be received from the service provider hosting the interactive voice application. The speech recognition result is a text string. However in other embodiments it may be in whatever format appropriate as long as it is exposed via an external API or SPI.

The format converter 16 converts the text signal from the speech recognition unit 14 into a format dictated by the device format selector 22. For instance the selector may be set to ASCII in which case the converter converts the text signal into an ASCII text signal and sends it to the transceiver 18. If the selector 22 is set to a DTMF signal the converter outputs DTMF signals or key 'names'. Alternatively the format converter 16 outputs WAP commands. The format converter 16 comprises a tone generator to produce DTMF key signals for onward transmission to the remote server.

In this embodiment the device format selector 22 matches an application to a pre-set format which is stored in memory. The application is identified by the phone number dialled to access the application and this is matched using a lookup table to an application type. In other embodiments the format selector acquires the input format of the application by manual selection or by interaction with the IVR application.

The transceiver 18 receives a signal from the format converter 16 and outputs it over the airwaves to base station transceiver 24. The base station transceiver 24 has an open channel to server 28 and forwards the signal to the application 30. Application 30 does not know whether the signal has been converted from speech or is a user generated signal as it would expect. The processing from the microphone input 12 to transmission to the server is quasi real time.

The IVR application 30 is, for example, a bank balance application that asks for your account number and password, waits for input in the form of DTMF key presses, looks up the particular account in a database and then outputs the account balance as speech. IVR applications are well known.

The sequence of method steps of the embodiment shown in FIG. 2 will be described with reference to FIG. 3. Step one, the format expected by the application 30 is acquired by the selector 22 from the application memory 20. Step two, the converter 16 is set to convert to the selected application format. Step 3, user input is accepted at the microphone 12 and then converted (step 4) by the speech recognition unit 14 into text. The text is converted into the selected format at step 5 by the converter 16. Finally the formatted speech is transmitted to the base station transceiver 24 by the transceiver 18 at step 6.

Figure 3:
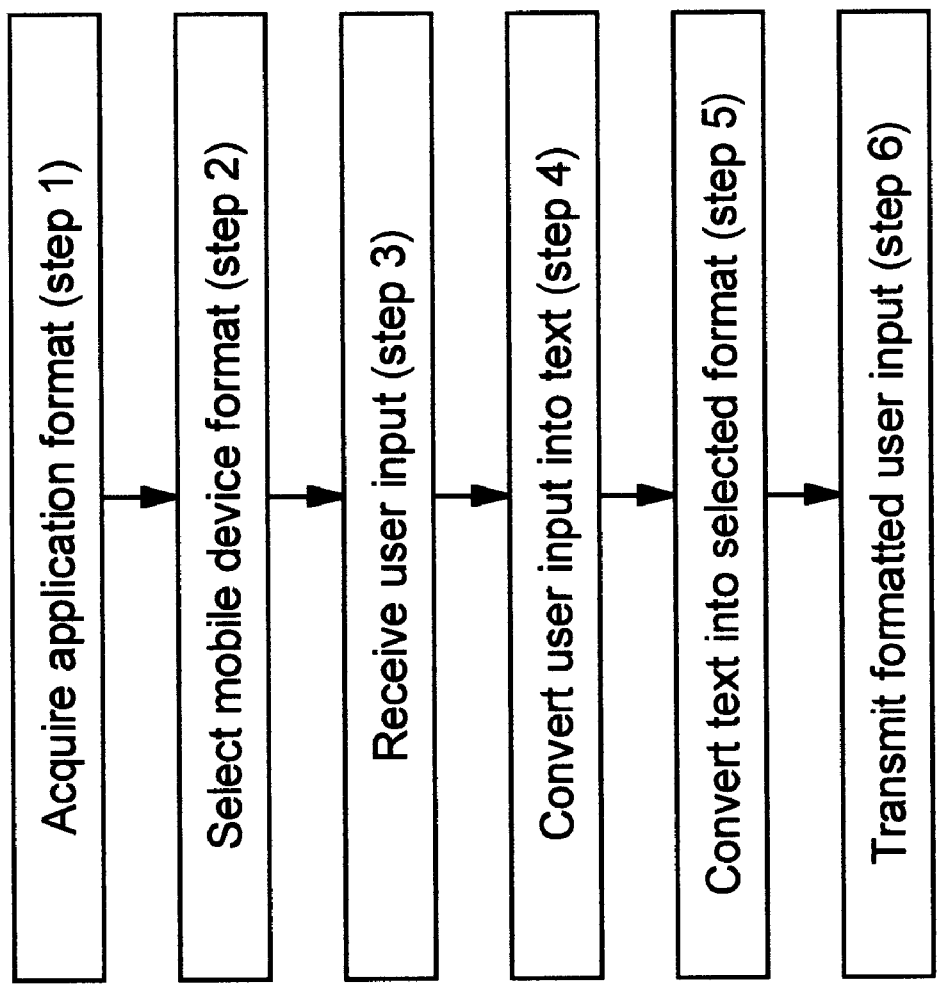
FIG. 3 is a schematic representation of the method of the embodiment.

An example event flow for the method of FIG. 3 is shown in FIG. 4. The client goes 'off hook' or 'dials' or establishes contact with the server to access the banking application (Step 1A). The server sets up the initial transaction (Step 2A). The server plays out prompts requesting the account code (Step 3A). The client speaks an N digit string e.g. '1234' (Step 4A). In the client process the speech string is sent through the client audio channel to the automatic speech recognition (ASR) 14 (Step 5A). In the client process the ASR module converts the audio signal to the text string e.g. '1234' (Step 6A). In the client process the result string is transferred to the DTMF format converter (Step 7A). In the client process the DTMF sequence is passed to the client device DTMF generator (Step 8A). In the client process the DTMF tones are transmitted to the server (Step 9A). The server receives and processes the DTMF input (Step 10A). The server validates and checks against a back end account database (Step 11A). The server plays a prompt back along the voice channel to the mobile client 'Account code:1234 Balance ú10,000' (Step 12A).

During call or interaction set-up, the client (mobile phone) server interaction remains unchanged as required by the specific back end service. In addition, however, any caller-specific details required, such as a personalised recognition vocabulary and so forth, would be initialised and made available. Interaction with the back end service would proceed as usual, in that the interactive voice application would prompt for specific input and the client device would transmit that input to the service for processing. For any given request-response interaction, however, the caller now simply speaks the response, and the following takes place. The audio channel is diverted to the speech recognition unit 14, which converts the signal to text. This text, the recognition result, is then passed to the format converter that based on the standard text input generates WAP command/ control signals or DTMF key "names" or sequences. The converted result is passed for transmission to standard modules within the mobile phone 10 to generate the DTMF tone sequences or appropriate command/control signals for the WAP interface. These are then transmitted to the back end IVR service as input to the specific application. And the application flow continues as usual. In this embodiment DTMF codes or WAP codes directly correlate to the text characters. However, in an alternative embodiment more complex mapping may be used. Further, conversion may be optimised such that partial recognition results can be submitted to the format converter in advance of complete recognition to bootstrap the format required.

The transmission of DTMF signals is significantly more robust and compliant to communications network specifications. A single input mode is all that is required by the service provider, although the user gains all of the benefits associated with ease and naturalness of use at the client end. Further, key ahead or fast path input can be supported without server-side echo-cancellation or barge-in enablement, as with any DTMF-type application: the incoming channel is processed directly and requires no special filtering or pre-processing. At the client side: the speech recognition unit simply needs to present for format conversion partial recognition results in some predefined unit (like full words, key words, etc.); any barge-in/echo-cancellation will only be required where the audio output and audio input streams are not already sufficiently isolated, but again, this is generally a standard function in such devices. Additionally, for WAP devices where the outgoing "prompts" are text-based anyway and for display on the local screen or panel, there is no need to isolate or pre-process any incoming audio signal.

The above embodiment is based on a mobile phone with voice recognition providing DTMF/WAP tones over a voice channel to a telephony server having a DTMF/WAP application. Another embodiment could comprise a mobile phone and voice recognition providing ASCII messages over a data channel to a telephony server having an ASCII application. A further embodiment could comprise a personal data assistant with voice recognition providing ASCII messages over a data channel to an Internet server having an ASCII application. A further embodiment could comprise a video camera with image recognition capability providing a DTMF formatted text description of an image over a voice channel to a telephony server.

The communication network described above is based on a wireless telephony network linked to a land telephony network since this is envisaged as the most likely scenario. Other permutations of communication networks could be used instead, including a land telephony network or an Internet telephony network.

In another embodiment the server downloads to the remote device at call set up time a set of service characteristics to identify what kind of functions can and cannot be supported to interact with the interactive service. This advantageously allows an existing server-based service to reduce the cost of introducing new features or supporting new access devices with low-function recognition or DTMF input capabilities. In this way, migration to additional input modes can be managed without necessarily requiring expensive service modification. The interaction is based not on the typical application or resource profile models available in most IVR platforms, but rather on the transactional input requirements at the server end, such as mapping all and any responses to a limited range of options. The input or client device can now accept whatever input the user chooses in whatever mode; the server then only receives input in the format it can cater for within the given service. This alleviates the need for ongoing and expensive piecemeal application development and service maintenance by capturing and exploiting functionality available in the client input device.

Figure 5:
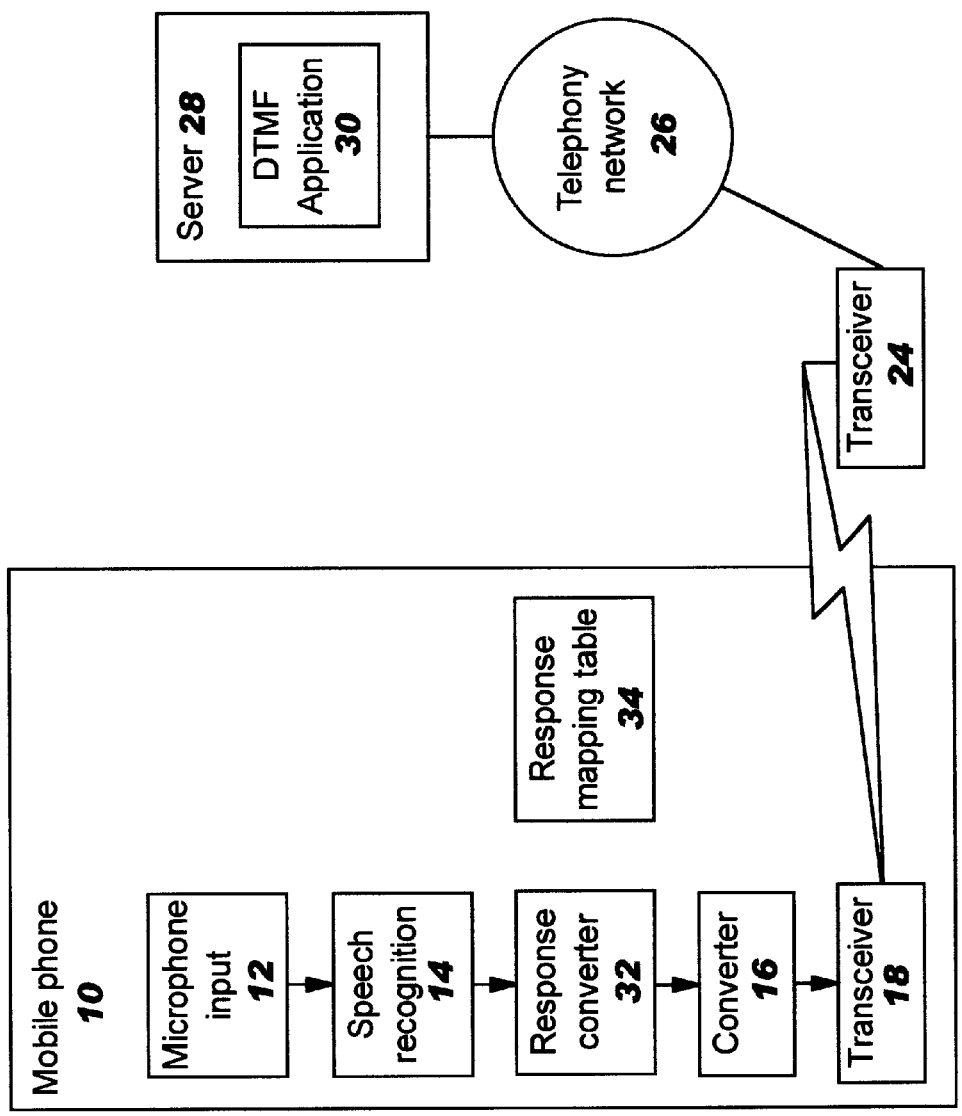
FIG. 5 is a schematic representation of a device of a further embodiment.

The extra functionality comprises a response converter 32 and a response mapping table 34 (see FIG. 5). The response mapping table 34 is a list of acceptable client device inputs and corresponding interactive voice application inputs on a transaction specific basis. It takes the form: for request type X map responses (A,B,C . . . ) to Y. Y is the response acceptable to the application and in the format used by the application, in this case a DTMF tone. The mapping table 34 is initially made available to the client device during call set-up but may be updated on a transaction-by-transaction basis. In this embodiment the IVR application sends a mapping table 34 to the client device through the network 26 via base station transceiver 24 and client device transceiver 26. The response converter 32 accepts a text input from the speech recognition unit 14 and matches the text with an acceptable interactive voice application input found from the mapping table 34. In the embodiment the match is a direct correlation with data in the mapping table. Alternatively a best fit match is made using statistical methods or natural language processing is applied to find the intention of the user and the intention is matched to an acceptable IVR input. The acceptable input is converted into the required format by the format converter 16 and sent to the IVR application. The format converter 16 chooses the format from the response mapping table 34. Normally only one format is used throughout but different formats may be used at different stages in the IVR application if necessary.

During initial call set-up, the client-server interaction includes the download from the server of an appropriate result mapping file. This may be the actual mapping file for a complete application or service, or may simply be an indicator to alert the client device that mapping, i.e . . . , local post hoc processing will be required. Interaction between the client and server during the call would remain essentially unchanged: the server prompts the caller and the client transmits the appropriate response to the server, with the following significant modifications. For a given prompt-response interaction, the client would process the incoming audio via the onboard (embedded) ASR function. The recognition result would be further processed locally in the client device to "interpret" the result: for discrete recognition, at this stage there is no further processing required. For continuous recognition, some form of parsing to extract the "intention" of the continuous input even as simplistically as keyword extraction is performed. The intention of the caller's input is then compared with the result mapping file. The "raw" input from the caller is then converted to one of the acceptable responses required for this prompt-response transaction. The mapped result (i.e . . . , the raw response from the caller converted to the acceptable option in the result mapping file) is then transmitted to the server as usual. As a simple example, a confirmation request from the server may map any of the following recognition results "Yes", "Yep", "OK", That's right . . . etc to "yes" or "1" or whatever is required by the server.

The local client device assumes the responsibility for the mapping based on the result mapping file from the server. The remote server-based application or service can therefore cater for a whole range of different responses without needing to change the application itself. The caller is therefore not limited to the range of input responses, whilst the back end service remains static. Further, the result mapping file is the only component requiring maintenance. The result mapping file may further be either a simple N to M mapping of actual input to acceptable inputs or may include defaults or commands such as "Timeout", "Help", "Replay" etc. Further, the remote server-based application need be no more sophisticated than a DTMF-based service: it is the client device which maps the actual input modality and actual caller response to the acceptable response or responses of the server.

Consider the example shown in FIG. 6 for a single request (to leave a voice message in this case); when the server passes the result mapping file, it is either at this stage or as part of a larger result mapping file at call set-up. The server plays a prompt such as "would you like to leave a message" (Step 1B). The client takes the caller response of "yes" or "yea" and recognises the input (Step 2B). The client maps "Yes please" to LEAVE MESSAGE or to Yes; or to DTMF 1 as dictated by the result mapping file (Step 3B), and transmits it to Server;. The server plays prompt: "for whom?" (Step 4B). Three different options are described which the embodiment may encounter. Option (a) the caller says John Smith (Step 5B) and the Client maps John Smith to MESSAGE FOR JOHN SMITH or MESSAGE FOR MBOX XYZ (Step 6B). Option (b) caller says Yes, for John Smith (Step 7B) and the Client maps Yes to LEAVE MESSAGE and MESSAGE FOR JOHN SMITH or MESSAGE FOR MBOX XYZ (Step 8B). In option (c) the caller says Mailbox 2334 (step 9B) and the Client maps Mailbox 2334 to LEAVE MESSAGE and MESSAGE FOR MBOX 2334 or MESSAGE FOR XYZ (step 10B). Finally the server plays the prompt: "please speak now/after the tone" . . . (step 11B) and the client speaks the message (step 12B).

There are a number of significant points to be highlighted in this example. First, a direct conversion may be necessary to reduce the multitude of possible responses to a single valid response as dictated by the server. Additionally, and alternatively, the client may convert the caller's input into a sequence of direct responses or to a sequence of pseudo-commands or to a mixture of both. The client only needs to map local input to what the server requires as dictated by the result mapping file provided by the server globally or on a request-by-request basis: it can interact back to the server in pseudo-code without having to know anything about the server, beyond the acceptable input to the server.

The mapping table and response converter allow multiple inputs from a user to be mapped to the acceptable range of responses for a given server request, thus reducing the processing required at the server. The mapping may be direct or to pseudo-code. Users are offered natural input transparently without expensive additional server code or service modification. Whilst the user-interface is sophisticated the remote service is in fact functionally quite simple. The added sophistication gives greater flexibility and increases customer satisfaction at a low cost.

In this embodiment the speech recognisor is a full text to speech recognisor but in another embodiment the response mapping table could contain typical voice responses and the response converter is capable of matching the spoken voice with the closest stored voice response and then mapping this to an accepted IVR response.

Existing telephony or e-commerce systems are typically available only in US English and perhaps one of two other languages, thus restricting the potential for globalization for large ISPs and international telcos. The cost of "translating" the service to other languages would be enormous but until now this has been the main method of extending the usability of these services, especially into smaller sized markets.

A further embodiment of a remote telephony device comprises limited vocabulary natural language translation functionality to allow the service to be conducted in the local language or language of choice by the user. The central service does not need to undergo expensive and language specific modification on a geography-by-geography basis. In this embodiment a local language to English translation is standard on the remote telephony device.

Language translation is provided by a module (not shown) between the speech recognition unit 14 and the response converter 32 which maps the input from the caller as returned by the speech recognition unit 14 to the required language. Alternatively the translation is made directly by the speech recognition unit 14 itself. A further alternative is that the response mapping table 34 and response converter 32 matches local speech with a response expected by the IVR application. In a yet further embodiment the response mapping table 34 could provide the response in the format expected by the IVR application.

Optionally the server may communicate the desired input language to the client and optionally the client should identify to the server its local language with a language identifier tag, such as the UNIX 11_cc convention (e.g . . . , en_GB, etc.). Any associated language data files like mapping specific items from one language to the server target language or pre-recorded prompts for output or back transmission to the server can be downloaded during such handshake-type communication. During call set-up, client-server handshake communication involves the identification to and from each side of the "local" language requirements. A US based server, for instance, may be in communication with a French cellular phone (possibly from France). Each device is responsible for processing and generating this information. In a cross-language environment, the server optionally downloads a translation table, or a simple list of expected or acceptable responses. Depending on the functional capabilities of the client, additional data files may be provided. The important thing, however, is that the server need only identify its language capabilities, and provide rudimentary or complex translation information: it does not need to switch languages. Introducing initial language identification communication between client and server provides the flexibility to offer "on-the-fly" translation.

The client would transmit outgoing prompts from the server as usual, either directly, or if capable, translate these locally. The incoming audio would be diverted to a client-end ASR module, returning a text string result. This would then be translated using the server-supplied information, before onward transmission to the server, either as pre-stored audio or an index into identified server-side audio, which could be processed by the server as direct input from the caller, or as a text-string. The caller, therefore, uses their own language for input, and optionally receives foreign or native output. The server need not switch languages at all, but simply identify its language capabilities and provide the client with appropriate information to be able to translate and respond in the server's language. For text-based devices (Pads, Web interfaces, etc) translation in either direction would simply involve table lookup.

Consider the following simple example from FIG. 7 for order-entry, the caller being based in France, the server in the US. The client requests service (Step 1C) from the server. The server identifies itself as US English by sending the code ens (Step 2C). The client identifies itself as a French device by returning the code fr_FR (Step 3C). The server then downloads any translation information to the client for storage in the response mapping table 34 (Step 3C); here, the example is a catalogue. The server IVR asks "What item do you want" (Step 4C) in English. If a translation of the prompt is available on the server then a French prompt is played. The caller says: "Meubles" (Step 5C) and client-side recognition in the speech recognisor 14 is performed before converted into an expected response by converter 32 and into the correct transmission format by converter 16 (Step 6C). The IVR receives the expected signal and continues the dialogue. "What furniture are you interested in" (Step 7C). The Caller says in French "Chaise" (Step 8C) and client-side recognition is performed before conversion into an expected response by converter 32 and then converted into the correct transmission format before onward transmission. (Step 9C).

Locally-based translation within the client device provides greater flexibility at the server-end for the provision of single-language, single-instance globally accessible services. Further, the device manufacturer can differentiate themselves through the sophistication of the locally-provided translation capabilities, provided that the server-to-client language identification handshake protocol is standardised. Any and all input from the user can then be translated from the language that the caller is using to the language required by the server. In this way, services may be globalized easily without the need for expensive and time consuming data collection or the requirement on the server to install and maintain the same service in parallel in different languages. Depending on the capabilities of the client device, it is further possible that outgoing information (prompts and so forth) can be locally translated for the user. The responsibility for the language i/o at the client end can be carried by the device manufacturer or any local service provider; the remote server, however, need not change to extend its services into new geographical areas.

Although the response mapping table has been described as available from the IVR application server it may be available from anywhere. A standard response mapping table may be available from the device supplier.

"Nokia" is a trademark of the Nokia Group.

Now that the invention has been described by way of a preferred embodiment, various modifications and improvements will occur to those persons skilled in the art. Therefore it should be understood that the preferred embodiment has been provided as an example and not as a limitation.

What is claimed is:

1. A method of communication for a speech enabled remote telephony device comprising the following steps:
   receiving user speech input into the remote device;
   performing speech recognition to convert the speech into text;
   providing a set of tone responses expected by the application;
   mapping the text onto said set of allowed tone response; and
   transmitting the allowed tone response over the voice channel to an interactive voice response (IVR) telephony application, said application requiring a tone input format as part of an interactive dialogue with the user whereby the application receives the allowable tone response from the user speech input.

2. A method as in claim 1 wherein the set of tone responses is transmitted by the application to the remote device prior to each part of the dialogue.

3. A method as in claim 1 wherein an allowed response is in a tone format and in converting user text to an allowed response the remote device also converts the user text into tones.

4. A method as in claim 3 wherein the remote device performs language translation to allow the application dialogue to be conducted in a language of choice by the user.

5. A method as in claim 4 wherein language translation is performed after the speech recognition and before the text to response mapping.

6. A method as in claim 4 wherein the translation is performed in the speech recognition step.

7. A method as in claim 4 wherein the speech recognition matches local speech with a response expected by the IVR application and performs basic language translation.

8. A method as in claim 7 wherein the speech recognition is separate from the text to response mapping.

9. A method as in claim 8 wherein the speech recognition step is incorporated into the text to response mapping step.

10. A method as in claim 1 wherein the remote telephony device is one of: a standard telephone over a fixed land telephony link; a mobile cellular phone; a mobile computer or personal data assistant over a wireless communication link.

11. A method as in claim 10 wherein the remote telephony device converts speech into a format that is one of ASCII text or DTMF tones or WAP format.

12. A method as in claim 11 wherein the remote telephony device may select the format depending on user command, on interaction with server application, or on a setting stored on a mobile device associated with the server application.

13. A speech enabled remote telephony device comprising:
   means for receiving user speech input into the remote device;
   means for performing speech recognition to convert the speech into text;
   means for providing a set of tone responses expected by the application;
   means for mapping the text onto said set of allowed tone response; and
   means for transmitting the allowed tone response over the voice channel to an interactive voice response (IVR) telephony application, said application requiring a tone input format as part of an interactive dialogue with the user whereby the application receives allowable response tone from the user speech input.

14. A device as in claim 13 wherein the set of tone responses is transmitted by the application to the remote device prior to each part of the dialogue.

15. A device as in claim 14 wherein an allowed response in the set of responses is in a tone format and in converting user text to an allowed response the remote device also converts the user text into tones.

16. A device as in claim 15 wherein the remote device performs language translation to allow the application dialogue to be conducted in a language of choice by the user.

17. A device as in claim 16 wherein language translation is performed after the speech recognition and before the text to response mapping.

18. A device as in claim 16 wherein the translation is performed in the speech recognition step.

19. A device as in claim 16 wherein the speech recognition matches local speech with a response expected by the IVR application and performs basic language translation.

20. A device as in claim 19 wherein the speech recognition is separate from the text to response mapping.

21. A device as in claim 20 wherein the speech recognition step is incorporated into the text to response mapping step.

22. A device as in claim 13 wherein the remote telephony device is one of: a standard telephone over a fixed land telephony link; a mobile cellular phone; a mobile computer or personal data assistant over a wireless communication link.

23. A device as in claim 22 wherein the remote telephony device converts speech into a format that is one of ASCII text or DTMP tones or WAP format.

24. A device as in claim 23 wherein the remote telephony device may select the format depending on user command, on interaction with server application, or on a setting stored on mobile device associated with server application.

* * * * *